(12) United States Patent
Nomura et al.

(10) Patent No.: US 6,606,320 B1
(45) Date of Patent: Aug. 12, 2003

(54) DATA COMMUNICATION SYSTEM AND METHOD, DATA TRANSMISSION DEVICE AND METHOD

(75) Inventors: Takashi Nomura, Tokyo (JP); Hiroshi Takizuka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/125,318

(22) PCT Filed: Dec. 19, 1997

(86) PCT No.: PCT/JP97/04730

§ 371 (c)(1),
(2), (4) Date: Jun. 25, 1999

(87) PCT Pub. No.: WO98/27693

PCT Pub. Date: Jun. 25, 1998

(30) Foreign Application Priority Data

Dec. 19, 1996 (JP) .............................. 8-339350

(51) Int. Cl.[7] .............................................. H04L 12/40
(52) U.S. Cl. ................................... 370/395.1; 370/438
(58) Field of Search ............................. 370/395.1, 468, 370/466, 467, 438; 709/230, 231, 232; 725/76, 106; 710/105, 113

(56) References Cited

U.S. PATENT DOCUMENTS

| 4,887,152 A | * 12/1989 | Matsuzaki et al. | ............ 725/76 |
| 5,623,610 A | * 4/1997 | Knoll et al. | ................ 710/105 |
| 5,808,660 A | 9/1998 | Sekine et al. | |
| 5,973,722 A | * 10/1999 | Wakai et al. | ................ 725/106 |
| 5,983,301 A | * 11/1999 | Baker et al. | ................ 710/113 |

FOREIGN PATENT DOCUMENTS

| EP | 0895377 A1 | * 2/1999 |
| JP | 4-266236 | 9/1992 |
| JP | 4-354222 | 12/1992 |
| JP | 6-311185 | 11/1994 |
| JP | 8-97837 | 4/1996 |
| JP | 8-340338 | 12/1996 |
| JP | 9-27814 | 1/1997 |
| WO | WO 98/27693 | * 6/1998 |

OTHER PUBLICATIONS

Bloks, R.H.J., "The IEEE–1394 High Speed Serial Bus", Philips Journal of Research, vol. 50, No. 1, Jan. 1, 1996, pp. 209–216, XP004008212.

Kunzman, A.J., et al., "1394 High Performance Serial Bus: The Digital Interface for ATV", IEEE Transactions on Consumer Electronics, vol. 41, No. 3, Aug. 31, 1995, pp. 893–900, XP002915355.

*Wide–Band ISDN and ATM Technology* (in Japanese) edited by IEICE, supervised by Aoki (and two others), Feb. 20, 1995, IEICE, Tokyo, pp 47–63; Figs. 3.7, 3.17.

Nikkei Electronics, No. 654, Jan. 29, 1996, Tokyo, pp. 113–120.

* cited by examiner

*Primary Examiner*—Edwin C. Holloway, III
(74) *Attorney, Agent, or Firm*—Frommer Lawrence & Haug LLP; William S. Frommer; Dennis M. Smid

(57) ABSTRACT

In a data transmission system, a data transmission method, a data transmitting apparatus and a data transmitting method according to this invention, in carrying out transmission of data at a predetermined transmit period from the server unit to the terminal equipment, an interrupt signal is generated at a scheduling period longer than a predetermined transmit period to carry out transmitting control of data every predetermined transmit period on the basis of quantity of transmittable data within one scheduling period unit. Thus, overhead of isochronous packet is reduced, thus making it possible to improve transmission efficiency.

48 Claims, 8 Drawing Sheets

DATA COMMUNICATION SYSTEM AND METHOD, DATA TRANSMISSION DEVICE AND METHOD

TECHNICAL FIELD

This invention relates to a data transmission system, a data transmission method, a data transmitting apparatus, and a data transmitting method, and more particularly to a data transmission system, a data transmission method, a data transmitting apparatus, and a data transmitting method which are capable of more efficiently carrying out transmission of data.

BACKGROUND ART

FIG. 1 represents an example of packet transmission format of the Institute of Electrical and Electronics Engineers, inc. (hereinafter referred to as IEEE) 1394 serial bus. As shown in this figure, packet is subjected to transmission at Isochronous Cycle of 125 μsec. At leading portions of respective isochronous cycles, Cycle start arbitration 101-1, 101-2, . . . , 101-n are disposed (allocated), and Cycle start packet 102-1, 102-2, . . . , 102-n are disposed (allocated) subsequently to Data prefix 111 at the next thereto. At the next of these Cycle start packet 102-1, 102-2, . . . , 102-n, Iso_gap 110 is disposed (allocated) subsequently to Data end 109.

In this case, Cycle start constituted by Cycle start arbitration 101-1, 101-2, . . . , 101-n and Cycle start packets 102-1, 102-2, . . . , 102-n is packet sent by cycle master node within IEEE 1394 serial bus (hereinafter simply abbreviated as 1394 serial bus or bus according as occasion may demand) and indicating start of isochronous cycle. Data prefix 111 indicates start of acknowledge packet in data packet or asynchronous transfer, and Data end 109 indicates end of acknowledge packet in data packet or asynchronous transfer. Iso.gap 110 represents idle of 1394 serial bus and sub action of the isochronous transfer is separated by Iso_gap 110.

At the next of Iso_gap 110, arbitration 103-1, 103-2, . . . , 103-n are disposed (allocated). At the portion next thereto, there are disposed (allocated) isochronous packet 104-11, 104-12, . . . , 104-nn of n number of channels with respect to client terminals connected to the 1394 serial bus. At leading portions of respective isochronous packets 104-11, 104-12, . . . , 104-nn, Data prefix 111 are respectively disposed (allocated).

In the isochronous transfer, broadcast transmission is carried out with respect to the client terminal by using channel No. represented by 8 bits. The receiving side takes thereinto only data of channel No. that the own side desires.

At the last portions of the n-th isochronous packet 104-1n, 104-2n, . . . , 104-nn, Data end 109 are respectively disposed (allocated). At the portions next thereto, Subaction_gap 112 is disposed (allocated). At the next of Subaction_gap 112, arbitration 105-1, 105-2, . . . , 105-n are disposed (allocated). Further, Asynchronous Transfer 106-1, 106-2, . . . , 106-n which are asynchronous packet are disposed (allocated) through Data prefix 111 and Data end 109 are respectively disposed (allocated) subsequently thereto. At the portion next thereto, Ack Transfer 107-1, 107-2, . . . , 107-n as acknowledge packet are disposed (allocated) subsequently to Data prefix 111, and Data end 109 are respectively disposed (allocated) subsequently thereto.

Subaction_gap 112 indicates idle of 1394 serial bus. Respective terminals monitor this gap time to thereby judge whether or not transmission can be made. When idle of a fixed time or more (longer than Iso_gap 110) is lasted (continued), the node which desires asynchronous transfer judges that bus can be used to execute arbitration (arbitration 105-1, 105-2, . . . , 105-n) for the purpose of bus acquisition. The node which has acquired use right of bus transmits data of asynchronous transfer (Asynchronous Transfer 106-1, 106-2, . . . , 106-n). The node which has received data of asynchronous transfer transmits acknowledge packet (Ack Transfers 107-1, 107-2, . . . , 107-n) as reception result with respect to node of sending source of its data which has been transmitted.

In FIG. 1, the case where transmission of one asynchronous packet is carried out is taken as an example. Subaction_gap 114 is last disposed (allocated) and Cycle start arbitration 108-1, 108-2, . . . , 108-n of the next isochronous cycle are disposed (allocated) subsequently thereto. In this case, Cycle start arbitration 108-1 of isochronous cycle #1 is Cycle start arbitration 101-2 located (in point of time) at the leading portion of the isochronous cycle #2.

Moreover, after isochronous transfer, asynchronous transfer can be executed until the next cycle. Even if this asynchronous transfer is continued until transmission time point of the next cycle start, that asynchronous transfer is not interrupted to stand by idle of the next bus, whereupon cycle start is caused to undergo transmission by the cycle master node. In the case where one cycle is continued for more than 125 μsec, the next cycle is shortened accordingly.

Lengths of respective isochronous channels (isochronous packets) are caused to be equal lengths calculated from the transmission band allocated to isochronous channels every respective isochronous cycles.

At respective isochronous packets, there are required overhead corresponding to time for Data prefix required at Physical Layer of IEEE 1394 (the number of bits corresponding to time corresponding to 16 clocks of BASE_RATE of 100 Mbps (precisely speaking, 98.304 Mbps) as basic rate (speed), overhead corresponding to time for Data end (the number of bits corresponding to time corresponding to 24 clocks of the BASE_RATE), and header for application for taking matching of isochronous packet header and application layout. In this case, according as length of isochronous packet is shortened, i.e., according as band required for isochronous channel becomes smaller, the ratio of these overheads becomes great.

For example, in the case where stream of AAL (ATM Adaptation Layer) 5-PDU (Protocol Data Unit) containing MPEG (Moving Picture Experts Group)-PS packet having the same length of 32 K bytes with respect to respective client terminals through IEEE 1394 serial bus from video server on ATM (Asynchronous Transfer Mode) network is caused to undergo transmission by CBR (Constant Bit Rate) service of 2 Mbps ($2.048 \times 10^6$ bps), ATM/1394 Bridge which carries out interface processing between ATM and IEEE 1394 is adapted so that isochronous packet length to be transmitted with respect to respective client terminals becomes equal to 32 bytes ($=2.048 \times 10^6/8000/8$) when IP/ATM (IP over ATM) header prescribed at the IP (Internet Protocol) and RFC (Request For Comments) 1483 is excluded.

In this case, overheads in the respective isochronous packets become equal to 22 bytes in total because it is required that overhead of Data prefix is about 16 bits (=2 bytes), isochronous header and CRC (Cyclic Redundancy Check) field prescribed at the Link Layer of IEEE 1394 are 12 bytes, and header for application is at least 8 bytes. In this case, since the overhead of Data end is reversely proportional to the number of isochronous packets transmitted within one isochronous cycle, it becomes very small value in the case of the prior art. For this reason, this is neglected. As a result, from ATM/1394 Bridge, with respect to isochronous packet to respective client terminals, 41% (=22 bytes/(22 bytes+32 bytes)) of the entirety serves as overhead, and very high rate is obtained.

Moreover, in the case where transmission speed (rate) of the 1394 serial bus is 100 Mbps, the maximum value of transmittable isochronous packet becomes equal to 1024 bytes. However, at this time, since the number of containable (connectable) client terminals of ATM/1394 Bridge is calculated as follows. Since overhead of the layer of the link layer or more of the IEEE 1394 constitutes problem, 19 terminals are limit per one 1394 serial bus by the following formula when overhead of 20 bytes obtained by subtracting only Data prefix from overhead of 22 bytes is taken into consideration:

1024 bytes/(32 bytes+20 bytes)=19.7

Further, there is also the problem that handling of packet by software is difficult. Since it is not realistic to carry out handling of packet by software at short period of 125 μsec, it is general to carry out processing in the state where scheduling by timer interruption, etc. is taken as the base. In ATM/1394 Bridge, in the case where period of scheduling is 2 m sec and the number of client terminals to be contained is set to 19 which is the maximum number, when the number of events per scheduling period (the number of overheads to be processed) is calculated, the number of events becomes equal to 304 (=19×2×10³/125) (events). It is required to carry out overhead processing of one isochronous packet within 6.6 μsec (=125 μsec/19). This is not realistic.

DISCLOSURE OF THE INVENTION

This invention has been made in view of such circumstances and contemplates permitting reduction of overhead so that data is permitted to efficiently undergo transmission, and permitting the number of client terminals which can be connected to one bus to be increased, and facilitating handling by software.

In the data transmission system, the data transmission method, the data transmitting apparatus and the data transmitting method according to this invention, in carrying out transmission of data from the server unit to the terminal unit at a predetermined transmit period, interrupt signal is generated at a scheduling period longer than the predetermined transmit period to carry out transmitting control of data every predetermined transmit period on the basis of transmittable data quantity within one scheduling period unit.

BEST MODE FOR CARRYING OUT THE INVENTION

Figure 2:
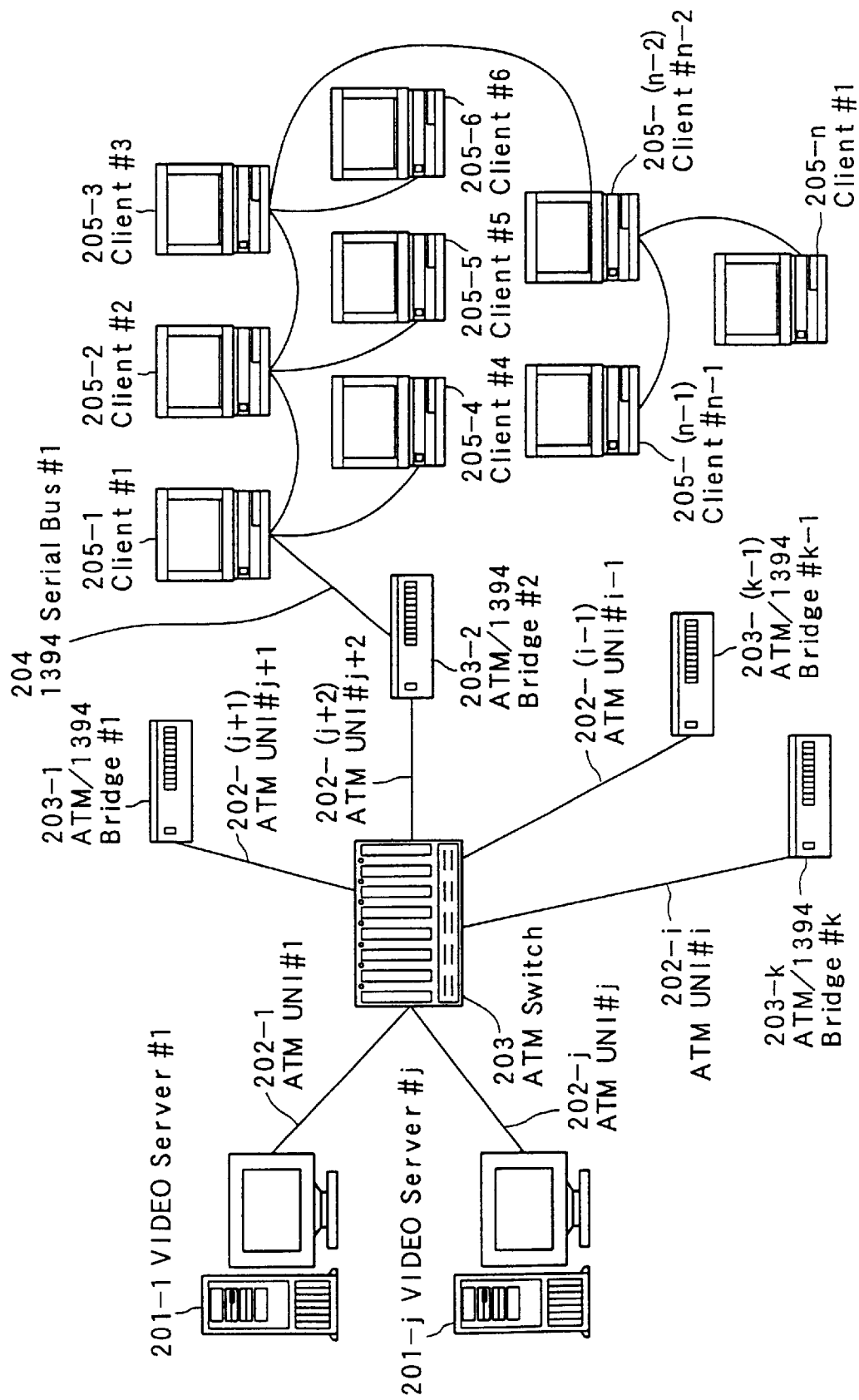
FIG. 2 is a block diagram showing an example of the configuration of a data transmission system according to this invention.

FIG. 2 shows an example of the configuration of a data transmission system of this invention. In this system, a video server 201-1 is connected with respect to an ATM UNI (User Network Interface) 202-1, and a video server 201-j is connected with respect to an ATM UNI 202-j. Further, the ATM UNI 202-1, 202-j are connected to an ATM Switch 203. An ATM/1394 Bridge 203-1 is connected to the ATM Switch 203 through an ATM UNI 202-(j+1). Further, an ATM/1394 Bridge 203-2 is connected to the ATM Switch 203 through an ATM UNI 202-(j+2), the ATM/1394 Bridge 203-(k−1) is connected to the ATM Switch 203 through an ATM UNI 202-(i−1), and the ATM/1394 Bridge 203-k is connected to the ATM Switch 203 through ATM UNI 202-i.

For example, n number of client terminals 205-1 to 205-n are connected to the ATM/1394 Bridge 203-2 through a 1394 serial bus 204 by the node branch system.

Figure 3:
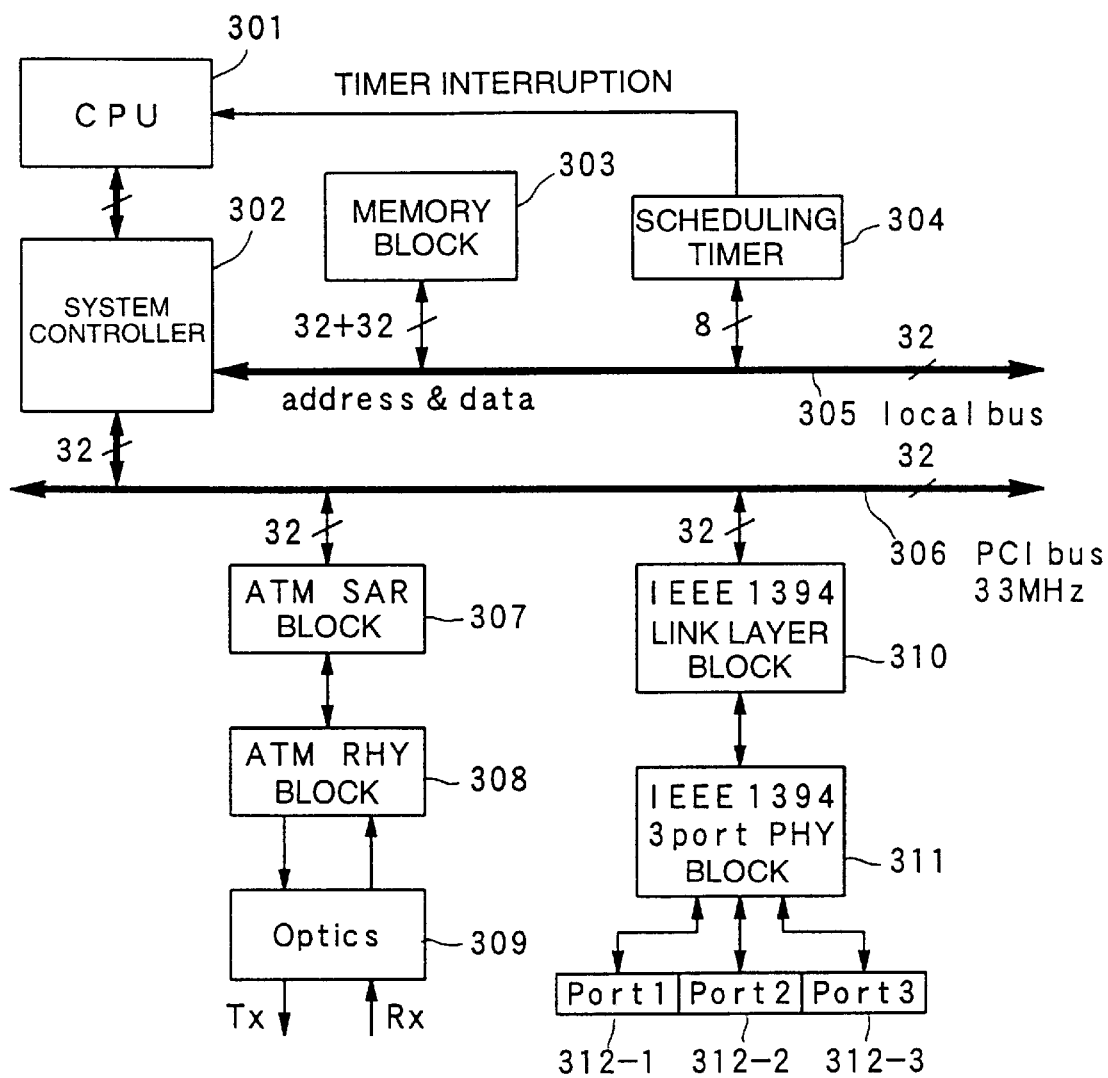
FIG. 3 is a block diagram showing an example of the configuration of ATM/1394 Bridge 203-1 shown in FIG. 2.

FIG. 3 shows an example of the configuration of the ATM/1394 Bridge 203-1. In this example, although not shown, other ATM/1394 Bridges 203-2, 203-3, . . . , 203-k are similarly constituted.

A CPU 301 controls, in accordance with program, an ATM SAR (Segmentation and Reassembly) block 307, an ATM PHY block 308, an IEEE 1394 link layer block 310, an IEEE 1394 3 port PHY block 311 and a system controller 302 to allow them to execute interface processing. A scheduling timer 304 serves to carry out timer operation of 2 m sec to output a timer interrupt signal to the CPU 301. A memory block 303 is connected to the system controller 302 through a local bus 305 to store thereinto packet data to be transmitted or received.

A block for carrying out transmit/receive processing with respect to the ATM switch 203 through a PCI (Peripheral Component Interconnect) bus 306, and a block for carrying out transmit/receive processing with respect to the 1394 serial bus are connected to the system controller 302. The former block is composed of the ATM SAR block 307, the ATM PHY block 308 and an Optics block 309, and the latter block is composed of the IEEE 1394 link layer block 310, the IEEE 1394 3 port PHY block 311 and ports 312-1 to 312-3.

The ATM SAR block 307 decomposes data delivered through the system controller 302 and the PCI bus 306 from the memory block 303 into ATM cells to deliver them to the ATM PHY block 308. Moreover, in a manner opposite to the above, the ATM SAR block 307 reassembles (composes) the ATM cells delivered from the ATM PHY block 308 to output data thus obtained to the memory block 303 through the system controller 302 and the PCI bus 306. The ATM PHY block 308 converts the ATM cells delivered from the ATM SAR block 307 into data corresponding to the specification of the Optics block 309 to output them to the Optics block 309, and converts the ATM cells inputted from the Optics block 309 into data of format of the ATM SAR block 307 to output them to the ATM SAR block 307. The Optics block 309 receives data by light signal delivered from the ATM switch 203 to deliver it to the ATM PHY block 308, and converts data delivered from the ATM PHY block 308 into light signal to output it to the ATM switch 203.

The IEEE 1394 link layer block 310 converts data of format of ATM inputted from the memory block 303 through the system controller 302 and the PCI bus 306 into data of format of 1394 serial bus set in advance by the CPU 301 to output it to the IEEE 1394 3 port PHY block 311, and to output, in a manner opposite to the above, data of format of 1394 serial bus inputted from the IEEE 1394 3 port PHY block 311 to the memory block 303 through the system controller 302 and the PCI bus 306. This data is converted into data of format of ATM by the CPU 301. The IEEE 1394 3 port PHY block 311 converts data inputted from the IEEE 1394 link layer block 310 into a signal of the IEEE 1394 serial bus to transmit it to the 1394 serial bus 204 through the ports 312-1 to 312-3. In addition, the IEEE 1394 3 port PHY block 311 outputs, to the IEEE 1394 link layer block 310, data received through the ports 312-1 to 312-3 from the 1394 serial bus 204.

Figure 4:
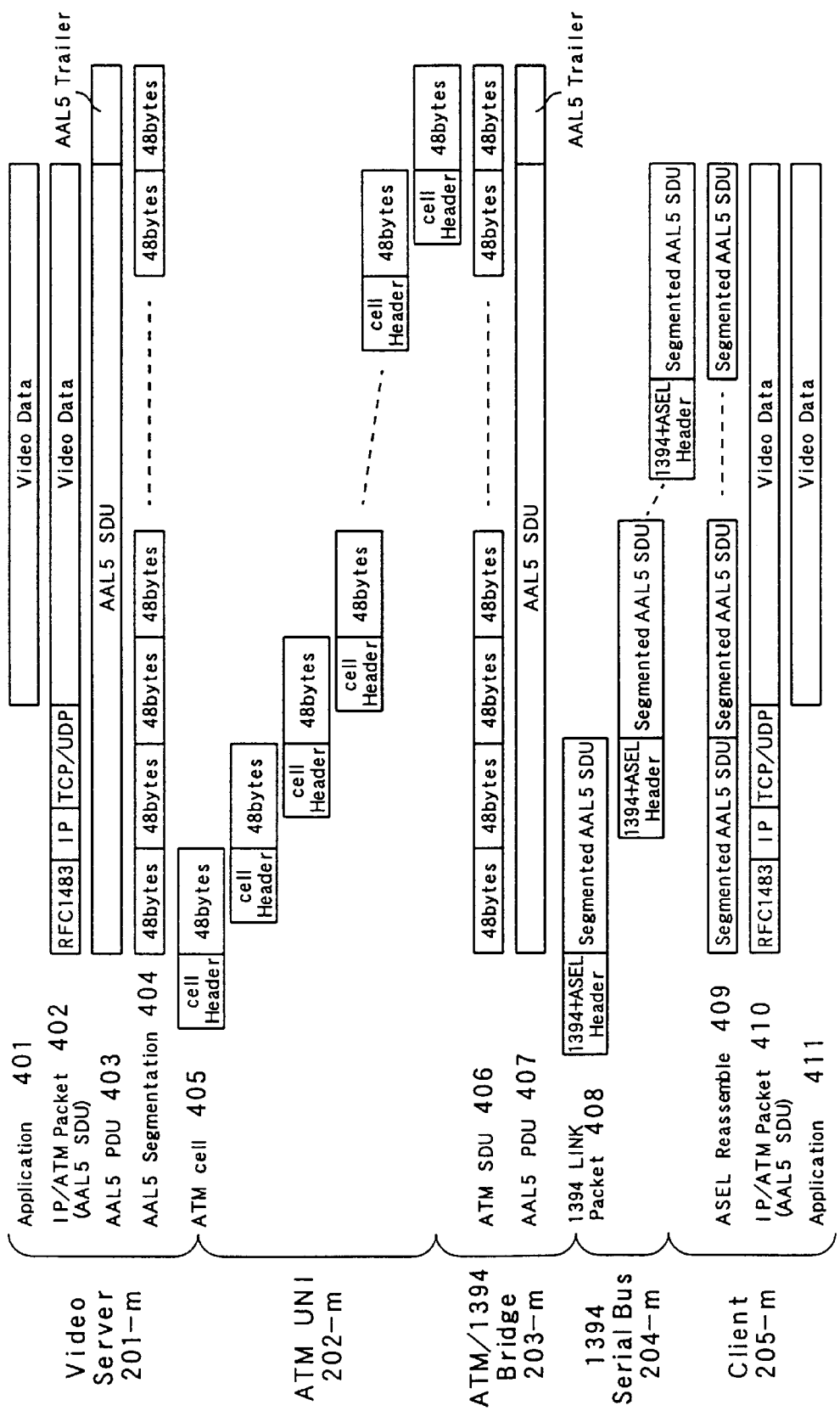
FIG. 4 is a view showing format of packet.

FIG. 4 shows the configuration of format of packet at video server 201-m, ATM UNI 202-m, ATM/1394 Bridge 203-m, the 1394 serial bus 204-m and client terminal 205-m. At the video server 201-m, RFC1483, IP & TCP (Transmission Control Protocol)/UDP (User Datagram Protocol) headers are added to video data of application 401. Thus, IP/ATM packet (AAL5 SDU (Service Data Unit)) 402 is generated.

Further, AAL5 Trailer is added to the last portion of this IP/ATM packet 402. Thus, AAL5 PDU (Protocol Data Unit) 403 is generated.

In addition, this AAL5 PDU403 is dissolved in 48 byte units, resulting in AAL5 Segmentation 404. Then, cell headers are respectively added to their leading portions. Thus, ATM cells 405 are constituted.

Namely, the video server 201-m processes, in order described above, video data of application 401 to output it to the ATM UNI 202-m as ATM cell 405. Moreover, in a manner opposite to the above, the video server 201-m processes, in order from lower portion to upper portion of FIG. 4, ATM cells 405 delivered from the ATM UNI 202-m to generate video data of application 401 to process it.

The ATM UNI 202-m carries out transmission of the ATM cell 405 from the video server 201-m to the ATM Switch 203, and carries out transmission of ATM cell 405 from the ATM Switch 203 to the video server 201-m.

The ATM Switch 203 carries out transmission of ATM cell 405 transmitted through the ATM UNI 202-m from the video server 201-m to the ATM/1394 Bridge 203-m through a predetermined ATM UNI 202-m. Moreover, in a manner opposite to the above, the ATM Switch 203 carries out transmission of ATM cell 405 transmitted through ATM UNI 202-m from a predetermined ATM/1394 Bridge 203-m to the video server 201-m through a predetermined ATM UNI 202-m.

At the ATM/1394 Bridge 203-m, respective cell headers are removed from the ATM cells 405 transmitted through ATM UNI 202-m from the ATM Switch 203. Thus, ATM SDUs 406 of 48 byte unit are extracted. Further, these ATM SDUs are gathered by a predetermined number. Thus, AAL5 PDU 407 is constituted. Further, AAL5 SDU (Service Data Unit) serving as payload portion of the AAL5 PDU407 is taken out. This AAL5 SDU is dissolved into a predetermined number of SDUs. Headers of 1394+ASEL (ATM over IEEE 1394 Serial Bus Emulation Layer) are respectively added to their leading portions, and are transmitted to the 1394 serial bus 204 as 1394 Link packet 408. Conversely, 1394 Link packet 408 transmitted from the 1394 serial bus 204 is converted into AAL5 SDU. From this AAL5 SDU, ATM SDUs 406 are further generated. Furthermore, cell headers are respectively added. Thus, ATM cells 405 are generated.

The processing between ATM cell 405, ATM SDU 406 and AAL5 PDU 407 among the above-mentioned processing are carried out at the ATM SAR block 307, and processing between AAL5 SDU and 1394 Link packet 408 is carried out at the CPU 301 and the IEEE 1394 Link layer block 310.

At the client terminal 205-m, headers are removed from the 1394 Link packet 408 transmitted through the 1394 serial bus 204-m. Composing (Reassembly) processing of ASEL is carried out (409). Further, this AAL5 SDU is composed (assembled). Thus, IP/ATM packet 410 is reconstructed. In addition, RFC 1483, IP & TCP/UDP headers are removed. Thus, video data of application 411 is extracted.

Moreover, conversely, RFC 1483, IP and TCP/UDP headers are added to video data processed by application 411. Thus, IP/ATM packet 410 is constituted. This IP/ATM packet 410 is further dissolved (Segmented AAL5 SDU 409) into packets. Headers are respectively added to those packets. The packets thus obtained are transmitted to the 1394 serial bus 204-m as 1394 Link packet 408.

As described above, video data transmitted from the video server 201-m is transmitted to the client terminal 205-m through the ATM UNI 202-m, the ATM Switch 203, the ATM UNI 202-m, the ATM/1394 Bridge 203-m and the 1394 serial bus 204.

It is to be noted that the video server and the client terminal are relatively prescribed. Thus, an arbitrary client terminal can serve as video server. In that case, the video server until that time may serve as client terminal.

Figure 5:
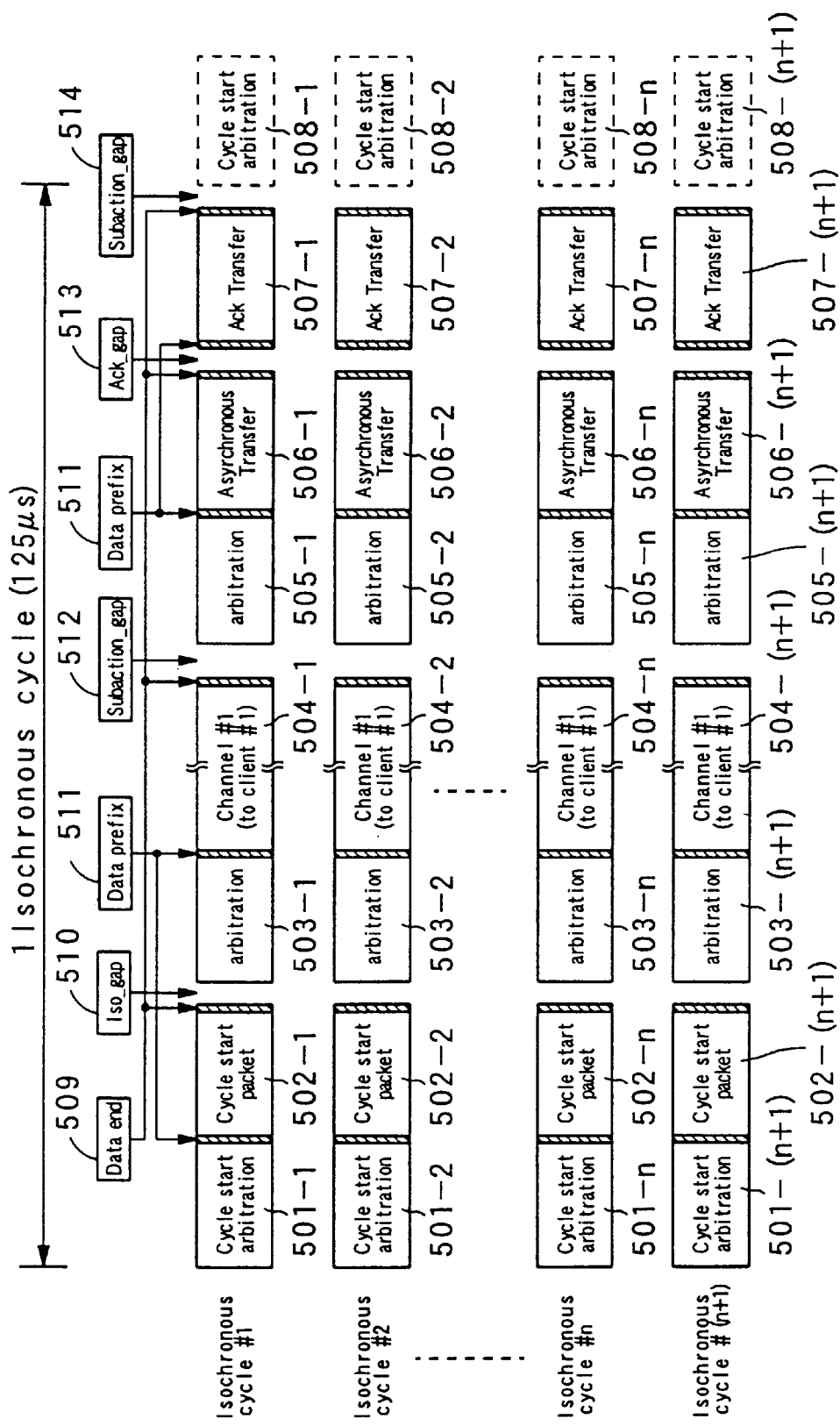
FIG. 5 is a view showing data format within isochronous cycle.

FIG. 5 shows transmission format of isochronous packet in the 1394 serial bus 204. As shown in this figure, packet is caused to undergo transmission at Isochronous Cycle of 125 μsec. Cycle start arbitration 501-1, 501-2, . . . , 501-n, 501-(n+1) are disposed (allocated) at leading portions of respective isochronous cycles, and Cycle start packet 502-1, 502-2, . . . , 502-n, 502-(n+1) are disposed (allocated) subsequently to Data prefix 511 at the portion next thereto. At the next of the Cycle start packet 502-1, 502-2, . . . , 502-n, 502-(n+1), Iso_gap 510 is disposed (allocated) subsequently to Data end 509.

In this case, Cycle start constituted by Cycle start arbitration 501-1, 501-2, . . . , 501-n, 501-(n+1) and Cycle start packet 502-1, 502-2, . . . , 502-n, 502-(n+1) is packet sent by the cycle master node within the 1394 serial bus 204, and indicating start of isochronous cycle. Data prefix 511 indicates start of data packet or acknowledge packet in the asynchronous transfer, and Data end 509 indicates end of data packet or acknowledge packet in the asynchronous transfer. Iso_gap 510 represents idle of 1394 serial bus 204, and subaction of the isochronous transfer is separated by Iso_gap 510.

At the next of the Iso_gap 510, arbitration 503-1, 503-2, . . . , 503-n, 503-(n+1) are disposed (allocated). After that, in one isochronous cycle, data of one isochronous channel 504-1, 504-2, . . . , 504-n, 504-(n+1) with respect to plural client terminals are disposed (allocated), and are caused to undergo transmission. For example, in the isochronous cycle #1, isochronous packet of channel #1 with respect to plural client terminals is transmitted. In the isochronous cycle #2, isochronous packet of channel #2 with respect-to the client terminals is transmitted. Data prefix 511 are disposed (allocated) at leading portions of respective isochronous packets.

In the isochronous transfer, broadcast transmission is carried out with respect to the client terminals by using channel Nos. represented by 8 bits. The receiving side takes thereinto only data of channel No. that the own side desires.

At the last portion of the isochronous packet, Data end 509 is disposed (allocated). At the portion next thereto, Subaction_gap 512 is disposed (allocated). At the portion next to Subaction_gap 512, arbitration 505-1, 505-2, . . . , 505-n, 505-(n+1) are disposed (allocated). Further, Asynchronous Transfer 506-1, 506-2, . . . , 506-n, 506-(n+1) which are asynchronous packets are disposed (allocated) through Data prefix 511 and Data end 509 are respectively disposed (allocated) subsequently thereto. In addition, at the portion next thereto, Ack Transfer 507-1, 507-2, . . . , 507-n, 507-(n+1) as acknowledge packet are disposed (allocated) subsequently to Data prefix 511 through Ack_gap 513, and Data end 509 are respectively disposed (allocated) subsequently thereto.

Subaction_gap 512 indicates idle of 1394 serial bus. Respective client terminals monitor this gap time to thereby judge whether or not transmission can be made. When idle of a predetermined time or more (longer than Iso_gap 510) is continued, node which desires asynchronous transfer judges that bus can be used to execute arbitrations for bus acquisition (arbitrations 505-1, 505-2, . . . , 505-n, 505-(n+1)). The node which has acquired use right of bus transmits data of asynchronous transfer (Asynchronous Transfer 506-1, 506-2, . . . , 506-n, 506-(n+1)). The node which has received data of asynchronous transfer transmits acknowledge packet (Ack Transfer 507-1, 507-2, . . . , 507-n, 507-(n+1) ) as reception result with respect to node of sending source of data which has been transmitted.

In FIG. 5, the case where transmission of one asynchronous packet is carried out is taken as an example. At the last portion, Subaction_gap 514 is disposed (allocated). Subsequently thereto, Cycle start arbitration 508-1, 508-2, . . . , 508-n, 508-(n+1) of the next isochronous cycle are disposed (allocated). In this case, Cycle start arbitration 508-1 of the isochronous cycle #1 is Cycle start arbitration 501-2 located (in point of time) at the leading portion of the isochronous cycle #2.

Moreover, after isochronous transfer, asynchronous transfer can be executed until the next cycle. Even if this asynchronous transfer is continued until transmission time point of the next cycle start, that asynchronous transfer is not interrupted. As a result, cycle start is transmitted by the cycle master node after waiting for idle of the next bus. In the case where one cycle is continued for 125 $\mu$sec or more, the next cycle is shortened accordingly.

Further, in the isochronous cycle #n, when isochronous packet of channel #n with respect to plural client terminals is transmitted, isochronous packet of channel #1 with respect to client terminal is transmitted for a second time in the isochronous cycle #(n+1) next thereto. Accordingly, isochronous packet is transmitted at a period of multiple of n of the isochronous cycle with respect to the client terminal.

Figure 6:
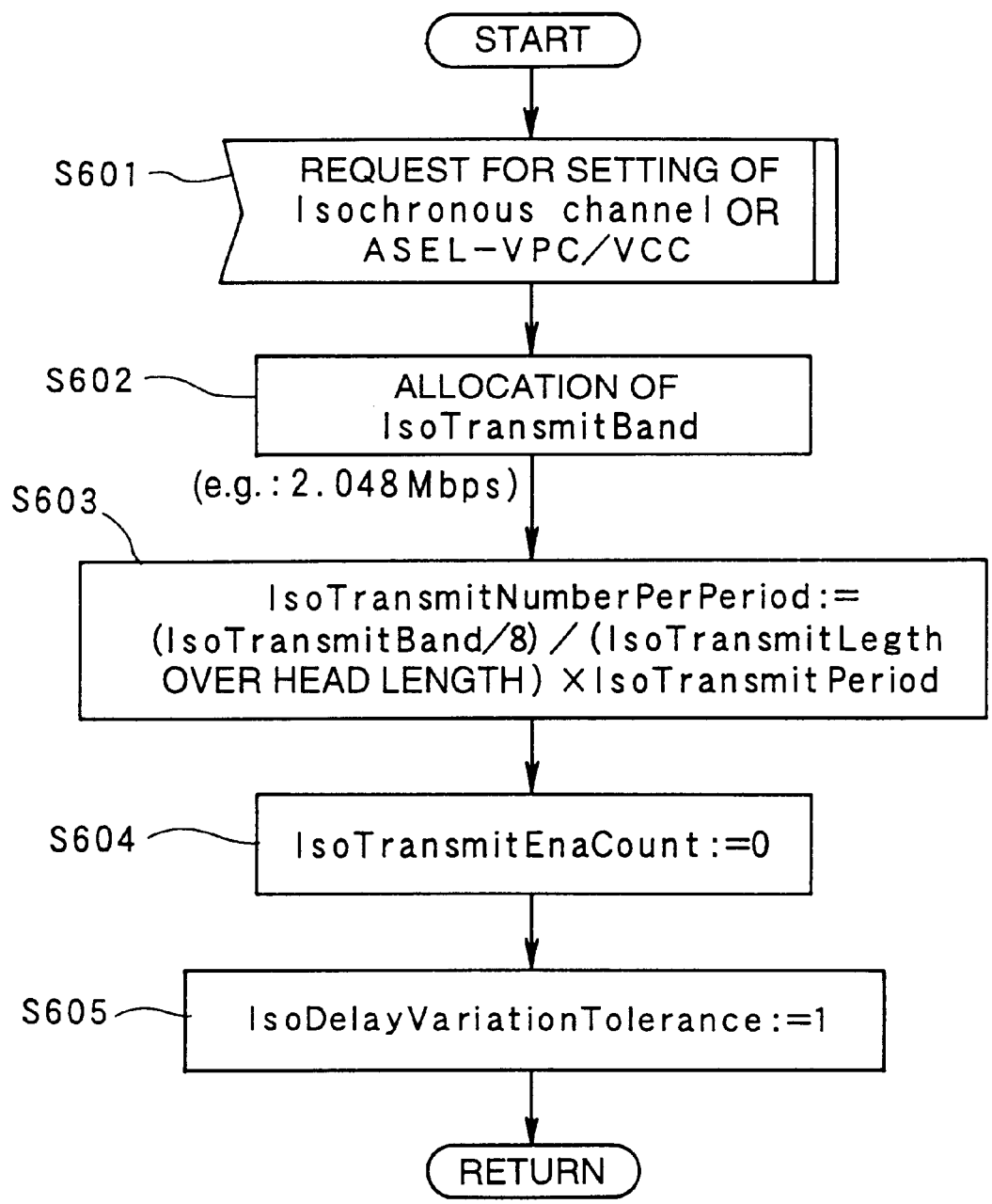
FIG. 6 is a flowchart for explaining processing in the initial state of ATM/1394 Bridge 203-1 of FIG. 2.

The procedure in which the ATM/1394 Bridge 203-m transmits isochronous packet will now be described with reference to the flowchart of FIGS. 6 and 7. The processing shown in the flowchart of FIG. 6 is processing carried out in advance in the ATM/1394 Bridge 203-m prior to carrying out transmission of video data with respect to the client terminal 205-m from the video server 201-m.

Initially, at step S601, application which carries out management of connection with respect to the client terminal 205-m of the ATM/1394 Bridge 203-m makes a request for setting of isochronous channel with respect to module which executes processing for transmitting data with respect to the client terminal 205-m. The transmitting module which has accepted this request stores, onto the table, isochronous channel corresponding to the client terminal to be transmitted in correspondence with this request. At this time, for example, the applicant of this application can also carry out request for setting of ASEL (ATM over IEEE 1394 Serial Bus Emulation Layer)-VPC (Virtual Pass Connection/VCC (Virtual Channel Connection) as previously proposed as the International Laid Open No. WO97/38513.

Then, processing operation proceeds to step S602, at which allocation processing of IsoTransmitBand is carried out. This IsoTransmitBand represents band in the transmitting direction of respective isochronous channels or ASEL-VCC, and has independent values every respective isochronous channels or ASEL-VCC. This value is caused to be, e.g., 2.048 Mbps.

Then, at step S603, operation result of the following formula is substituted with respect to parameter IsoTransmitNumberPerPeriod.

$$(\text{IsoTransmitBand}/8)/(\text{IsoTransmitLength}-\text{OverHeadLength}) \times \text{IsoTransmitPeriod}$$

This IsoTransmitNumberPerPeriod represents the number of isochronous packets which can be transmitted per one scheduling period, and this parameter has values independent every respective isochronous channels or ASEL-VCC. In this case, IsoTransmitLength is isochronous packet length to be transmitted which has been calculated in accordance with traffic of isochronous packet of the entirety of the system, and has values independent every respective isochronous channels or ASEL-VCC. IsoTransmitPeriod represents period of timer interruption which provides basis of the scheduling.

When it is assumed that IsoTransmitBand is $2.048 \times 10^6$ bps (bit per second), IsoTransmitLength is 816 bytes, overhead length is 20 bytes, and IsoTransmitPeriod is $2 \times 10^{-3}$ sec. IsoTransmitNumberPerPeriod becomes equal to 0.64.

Then, at step S604, 0 (zero) is initially set at IsoTransmitEnaCount. This IsoTransmitEnaCount represents count value indicating the number of isochronous packets which can be transmitted within the scheduling period, and has values independent every respective isochronous channels or ASEL-VCC.

At step S605, 1 is initially set at IsoDelayVariationTorelance representing allowed value of the number of isochronous packets which are permitted to undergo transmission within the scheduling period for absorbing delay fluctuation. This value also has values independent every respective isochronous channels or ASEL-VCC. The CPU 301 carries out these processing.

Figure 7:
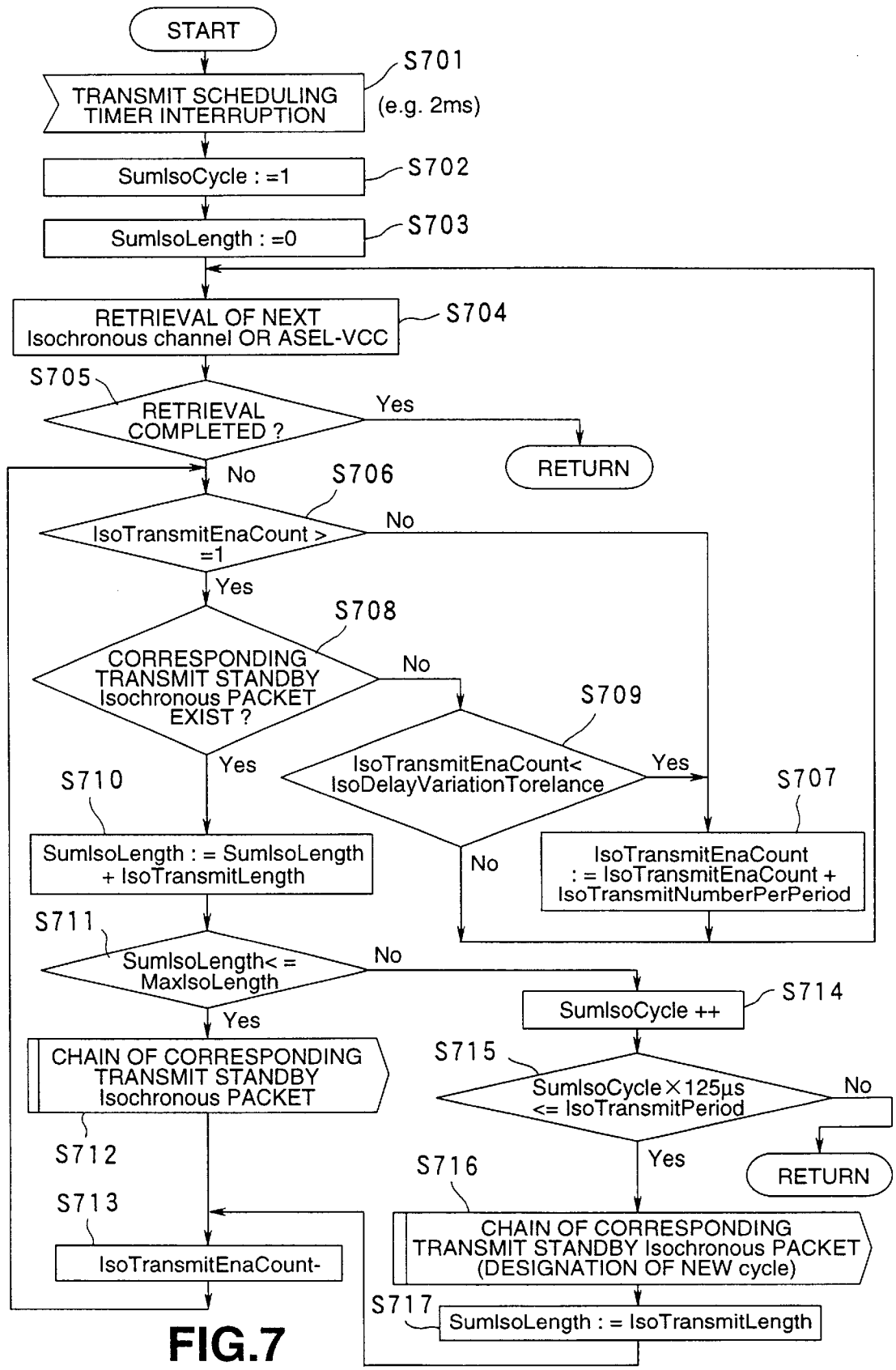
FIG. 7 is a flowchart for explaining processing every scheduling period of the ATM/1394 Bridge 203-1 of FIG. 2.

The processing of the flowchart of FIG. 7 is started when scheduling timer 304 generates a timer interrupt signal at period of timer interruption set at IsoTransmitPeriod (2 m sec, in this case) at step S701. At step S702, the CPU 301 of the ATM/1394 Bridge 203-1 initially set 1 at parameter SumIsoCycle representing the number of isochronous cycles in total within the scheduling period. At step S703, in respective isochronous cycles, 0 is initially set at parameter SumIsoLength representing total value of isochronous packet lengths which have been transmitted in respective isochronous cycles.

Then, at step S704, retrieval of the next isochronous channel (or retrieval of ASEL-VCC which will be referred to as retrieval of channel hereinafter) is carried out. At step S705, whether or not retrieval has been completed is judged. In the case where it is judged that retrieval has been completed, the processing is completed. In the case where it is judged that channel to be retrieved is still left, the processing operation proceeds to step S706, at which whether or not IsoTransmitEnaCount is 1 or more is judged. In this case, since 0 is set at this parameter at the step S604 of FIG. 6, the processing operation proceeds to step S707, at which the number of transmittable isochronous packets IsoTransmitNumberPerPeriod (e.g., 0.64) per one scheduling period is added to IsoTransmitEnaCount.

Further, the processing operation returns to the step S704, at which retrieval of the next channel is executed. At step S705, it is judged that retrieval has been completed. Thus, processing is once completed.

After timer interruption period (2 m sec in this case) set at IsoTransmitPeriod, processing of the steps S701 to S705 are carried out for a second time. In the case where it is judged at the step S705 that any channel which is not retrieved is still left, the processing operation proceeds to step S706, at which whether or not IsoTransmitEnaCount is 1 or more is judged for a second time. Since value set at the step S707 is 0.64 at period immediately before, its value is equal to 1 or less to proceed to step S707 for a second time, at which IsoTransmitNumberPerPeriod is further added to current value, resulting in 1.28 (=0.64+0.64). Further, processing is once completed through the steps S704, S705.

When the processing operation proceeds to step S706 through the steps S701 to S705 at the next scheduleing period, since IsoTransmitEnaCount is more than 1 (=1.28) in this case, the processing operation proceeds to step S708.

At the step S708, whether or not transmit standby isochronous packet exists is judged. In the case where such isochronous packet exists, the processing operation proceeds to step S710, at which IsoTransmitLength is added to SumIsoLength. In this case, 0 is initially set at the step S703 with respect to SumIsoLength. When IsoTransmitLength is assumed to be 816 bytes, value "816" is set at SumIsoLength.

Then, the processing operation proceeds to step S711, at which whether or not SumIsoLength set at the step S710 is maximum value MaxIsoLength or less that ATM/1394 Bridge 203-m can transmit within one isochronous cycle is judged. If SumIsoLength is MaxisoLength or less, the processing operation proceeds to step S712, at which processing to carry out chain is executed in order to transmit transmit standby isochronous packet at the isochronous cycle which is the same as the previous packet. Further, the processing operation proceeds to step S713, at which IsoTransmitEnaCount is decremented by 1. Thereafter, the processing operation returns to the step S706. Thus, processing subsequent thereto are repeatedly executed. This chained packet is caused to undergo transmitting processing at the next scheduling period.

In the case where it is judged at the step S711 that SumIsoLength is greater than MaxIsoLength, the processing operation proceeds to step S714, at which SumIsoCycle is incremented by 1. Further, at step S715, whether or not value of SumIsoCycle×125 µsec is IsoTransmitPeriod or less is judged. In the case where it is judged that value of SumIsoCycle×125 µsec is greater than IsoTransmitPeriod, the processing is completed. In the case where it is judged that the former and the latter are equal to each other, or the former is smaller than the latter, the processing operation proceeds to step S716, at which processing for carrying out chain is executed in order to carry out transmission of transmit standby isochronous packet at the next (different from the previous packet) isochronous cycle. Further, the processing operation proceeds to step S717, at which IsoTransmitLength is set at SumIsoLength. Then, the processing operation proceeds to the step S713, at which IsoTransmitEnaCount is decremented by 1. Further, the processing operation returns to the step S706. Thus, processing subsequent thereto are repeatedly executed. This chained packet is caused to undergo transmitting processing at the next scheduling period.

On the other hand, in the case where it is judged at the step S708 that transmit standby isochronous packet does not exist, the processing operation proceeds to step S709, at which whether or not IsoTransmitEnaCount is smaller than allowed value IsoDelayVariationTolerance of the number of isochronous packets which can be transmitted within the scheduling period for absorbing delay fluctuation is judged. In the case where it is judged that IsoTransmitEnaCount is smaller than the allowed value IsoDelayVariationTorelance, the processing operation proceeds to step S707, at which processing for adding IsoTransmitNumberPerPeriod to current IsoTransmitEnaCount is carried out. Thereafter, the processing operation returns to the step S704. In the case where it is judged that IsoTransmitEnaCount is equal to IsoDelayVariationTorelance, or is greater than that, the processing of the step S707 is skipped, and the processing operation returns to the step S704. Thus, processing subsequent thereto are repeatedly executed.

The above-mentioned processing will now be described in more detail. At the step S704 of FIG. 7, isochronous channel or ASEL_VCC is retrieved from table prepared at the step S601 of FIG. 6. Assuming now that n number of channels exist at this Table, e.g., the first channel #1 is retrieved. Since it is judged at the step S705 that retrieval has not yet been completed, the processing operation proceeds to step S706, at which whether or not IsoTransmitEnaCount of channel #1 is 1 or more is judged. Since this value is initially set to 0 (zero) at the step S604 in this case, the processing operation proceeds to step S707, at which IsoTransmitNumberPerPeriod (e.g., 0.64) is added to IsoTransmitEnaCount.

Then, the operation processing returns to the step S704, at which the next channel #2 is retrieved from the Table. Since value of its IsoTransmitEnaCount is 0 (zero) now at the step S706 also in this channel #2, the processing operation proceeds to step S707, at which 0.64 is added.

Then, the processing operation returns to the step S704, at which channel #3 is retrieved. In a manner similar to the above, at times subsequent thereto, values of 0.64 are respectively set to IsoTransmitEnaCount of the channel #3 to channel #n.

When it is judged at the step S705 that retrieval of n number of channels has been completed, the processing shown in this flowchart of FIG. 7 is once completed.

Further, when the processing shown in the flowchart of FIG. 7 is started for a second time at the next scheduling period, the channel #1 is first retrieved at the step S704. At step S706, whether or not IsoTransmitEnaCount of channel #1 is 1 or more is judged. Since this value is 0.64 in this case, i.e., the number of packets is less than one packet, the processing operation proceeds to step S707, at which 0.64 is further added to IsoTransmitEnaCount, resulting in total value of 1.28.

Then, the processing operation returns to the step S704, at which channel #2 is retrieved. Thus, similar processing is executed. In this way, 1.28 is set to IsoTransmitEnaCount from channel #1 to channel #n. When it is judged at the step S705 that processing with respect to the entirety of n number of channels have been completed, this processing is once completed.

Further, when processing shown in the flowchart of FIG. 7 is started for a second time at the next scheduling period, channel #1 is retrieved at the step S704. At step S706, whether or not value of its IsoTransmitEnaCount is 1 or more is judged. Since this value is 1.28 in this case, the processing operation proceeds to step S708, at which whether or not transmit standby isochronous packet exists is judged. In the case where this packet exists, the processing operation proceeds to step S710, at which length of one isochronous packet, i.e., IsoTransmitLength (e.g., 816 bytes) is added to length SumIsoLength of packet caused to undergo transmission at one isochronous cycle (125 $\mu$sec). Thus, 816 is set to SumIsoLength in this case.

At step S711, whether or not value of SumIsoLength set at the step S710 is transmittable isochronous packet length MaxIsoLength (e.g., 1024 bytes) within one isochronous cycle (125 $\mu$sec) or less is judged. Since SumIsoLength is 816, and is therefore smaller than 1024 in this case, the processing operation proceeds to step S712, at which transmit standby isochronous packet is chained (designated) in order to carry out transmission at the same isochronous cycle as the previous packet. This chained packet is caused to undergo transmitting processing at the next scheduling period.

Further, the processing operation proceeds to step S713, at which IsoTransmitEnaCount is decremented by 1. As a result, this value changes from 1.28 to 0.28 in this case.

Further, the processing operation returns to the step S706, at which whether or not its value is 1 or more is judged. Since this value is 0.28 in this case and is less than 1, the processing operation proceeds to step S707, at which 0.64 is added for a second time, resulting in 0.92.

Then, the processing operation proceeds to the step S704, at which the next channel #2 is retrieved. Also with respect to the channel #2, similar processing is executed. The processing operation proceeds to step S708. If transmit standby isochronous packet exists at this time, one isochronous packet length 816 is added to length of packet SumIsoLength within one isochronous cycle at step S710. Thus, value of SumIsoLength becomes equal to 1632.

At step S711, whether this 1632 (SumIsoLength) is smaller than 1024 (MaxIsoLength) is judged. Since 1632 is clearly greater than 1024, judgment of NO is carried out at the step S711 in this case. In this case, when attempt is made to carry out transmission of two packets at one isochronous cycle, its length is caused to have 1632 bytes. As a result, this length value is above packet length 1024 bytes which is permitted to undergo transmission within one isochronous cycle. Accordingly, this data is caused to undergo transmission at the next isochronous cycle. For this reason, the processing operation proceeds to step S714, at which the number of isochronous cycles SumIsoCycle is incremented by 1. Thus, current number of isochronous cycles becomes equal to 2 in this case.

Then, the processing operation proceeds to step S715, at which value obtained by multiplying SumIsoCycle set at the step S714 by 125 is 2 m sec or less is judged. Namely, whether or not current length is length which is permitted to undergo transmission within one scheduling period is judged. In the case where it is judged that the value obtained by multiplying SumIsoCycle by 125 is greater than one scheduling period, such value cannot still be processed within 2 m sec. For this reason, the processing is completed.

On the contrary, in the case where it is judged that value obtained by multiplying SumIsoCycle by 125 is smaller than 2 m sec, the processing operation proceeds to step S716, at which transmit standby isochronous packet is chained (designated) as packet caused to undergo transmission at the next isochronous cycle (different from the previous packet).

In the case of this example, since SumIsoCycle is 2, respective packets are transmitted by using two isochronous cycles.

Then, the processing operation proceeds to step S717, at which isochronous packet length 816 of channel #2 previously chained is set to total value SumIsoLength of isochronous packet length transmitted within one isochronous cycle. This chained packet is caused to undergo transmitting processing at the next scheduling period.

Further, the processing operation proceeds to step S713, at which value of IsoTransmitEnaCount is decremented by 1. In this case, such value is assumed to be 0.28. The processing operation returns to the step S706, at which it is judged that such value is less than 1. Then, the processing operation proceeds to step S707, at which 0.64 is added for a second time. Thus, value of IsoTransmitEnaCount is set to 0.92. Also with respect to channel #3 to channel #n, respective similar processing are executed.

When 0.92 is set at IsoTransmitEnaCount of n number of channels in a manner as described above, retrieval is once completed at the step S705.

When values of IsoTransmitLength in respective channels are assumed to be value which is one half or more of 816 bytes and 1024 bytes of the maximum value MaxIsoLength as stated above, only data of one isochronous channel is caused to undergo transmission within one isochronous cycle as shown in FIG. 5.

It is to be noted that in the case where it is judged at the step S708 that isochronous packet to be transmitted does not exist, the processing operation proceeds to step S709. If it is judged at the step S709 that the number of packets caused to undergo transmission within the scheduling period, which is represented by IsoTransmitEnaCount, is smaller than allowed value IsoDelayVariationTorelance, even if there is any fluctuation in the transmission path, packets are permitted to further undergo transmission. For this reason, at the step S707, 0.64 is further added to IsoTransmitEnaCount. In the case where value of IsoTransmitEnaCount is greater than allowed value IsoDelayVariationTorelance, if the number of packets caused to undergo transmission is increased any more, there is the possibility that transmission of packet cannot be correctly carried out resulting from fluctuation of the transmission path. Accordingly, the processing of the step S707 is skipped.

Figure 1:
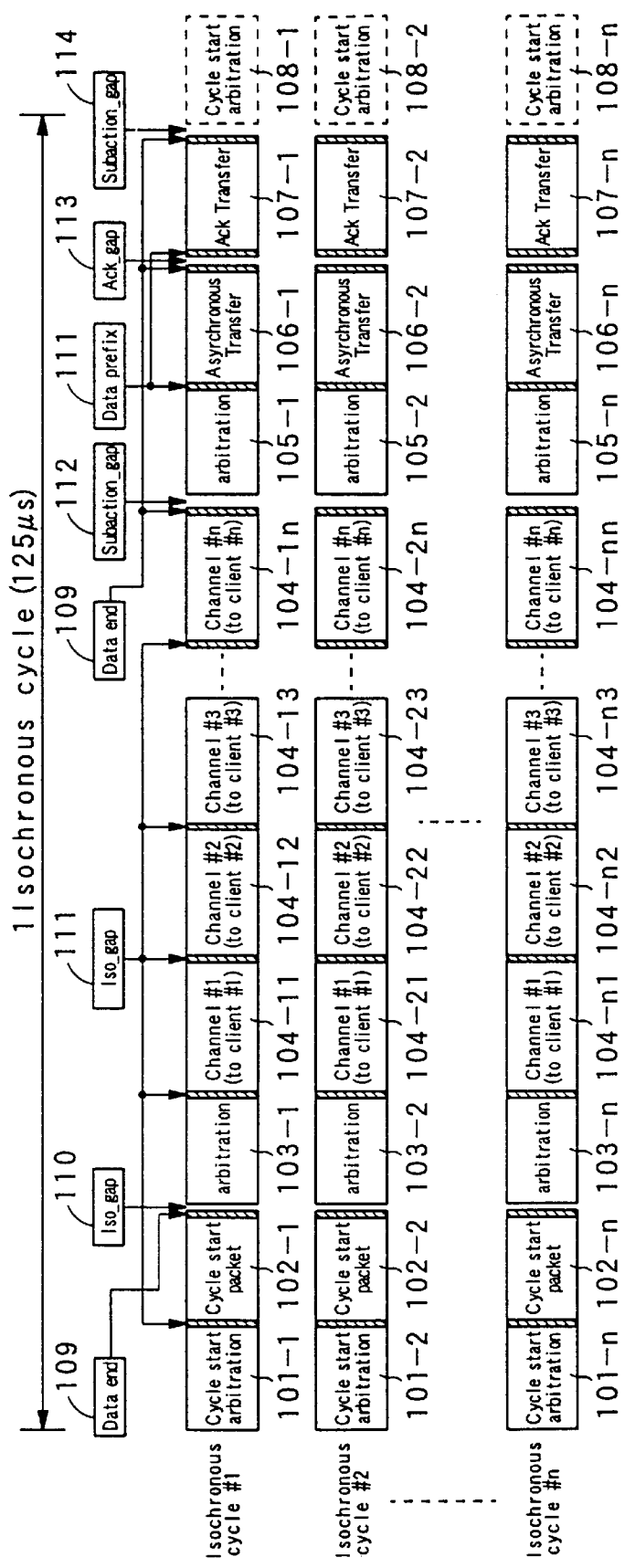
FIG. 1 is a view showing data format within conventional isochronous cycle.

If values of IsoTransmitLength in respective channels are set to value which is 1/n of the value of MaxIsoLength in the processing shown in FIGS. 6 and 7, overhead is slightly elongated, so the transmission efficiency is lowered. Similarly to the conventional case shown in FIG. 1, n number of channels may be also provided within one isochronous cycle.

In this embodiment, with respect to information (e.g., video information) of application of at least the same kind, transmission of information is carried out by using only one isochronous packet within one isochronous cycle. However, in the case of application in which required band is small such as telephone (64 K bps) or audio on demand (384 K bps), etc., there are instances where employment of a system of carrying out transmission of information with respect to plural client terminals within one isochronous cycle is efficient. Accordingly, this invention is not limited to such implementation. As a data transmission method applicable to all applications in this invention, there is employed a system of carrying out transmission of data every plural isochronous cycles with respect to information of applications of the same kind with respect to specific one client terminal (e.g., client terminal 205-1). Namely, when N is assumed to be integer of 2 or more and the period of isochronous cycle is assumed to be T (=125 µsec), transmission of information with respect to one client terminal is carried out every period NT.

In this case, in order to calculate isochronous packet length IsoTransmitLength to be transmitted, traffic in the client terminal direction from ATM/1394 Bridge is assumed to some degree in advance. In the case of the system as shown in FIG. 2, the greater part of traffic is assumed as data stream from the video server 201-m to the client terminal 205-m. In view of the above, transmit isochronous packet length is caused to be length which is about 80% of the maximum value of transmittable isochronous packet length. In addition, its length is aligned in 32 bit units thus to facilitate processing both at the transmitting side and at the receiving side.

In the case where, e.g., the maximum length of the transmittable isochronous packet is caused to be 1024 bytes similarly to the conventional case, it is suitable that the isochronous packet length is about 816 bytes when overhead of 20 bytes of layer of the link layer or more is included.

In this case, transmit period of the isochronous packet is calculated from the band (band of content) allocated to the isochronous channel. Moreover, in the case where ASEL in the case in the International Laid Open No. WO97/38513 that the applicant of this application has already proposed is used, this transmit period is calculated from the band allocated to VCC set on the isochronous channel. In this case, for simplification of calculation, this transmit period is caused to be value in which overhead portion is excluded from the value of this band. In the case where the band is, e.g., 2.048 Mbps, transmit period n (integer) can be determined as n=24 from the following formula.

$$2.048 \times 10^6 = (816-20) \times 8 \times 8000/n$$

Namely, ATM/1394 Bridge transmits isochronous packet to isochronous channel or VCC set on the isochronous channel every 24 isochronous cycles with respect to a client terminal. Thus, 24 client terminals can be accommodated with respect to one ATM/1394 Bridge.

Also in regard to handling of packet by software, in the case where packet handling is assumed to be carried out by scheduling by timer interruption of 2 m sec, when the number of client terminals is assumed to be 24, the number of events. per scheduling period (the number of overheads to be processed) becomes equal to 16 (=1×2×10³/125). This value is a value which sufficiently permits handling of isochronous packet by software.

As stated above, in the system of FIG. 2, for example, 300 to 500 client terminals can be accommodated per 1 ATM Switch.

On the contrary, in the case of small scale system in which the number of client terminals is 50 to 60, 1394 serial bus may be directly connected with respect to video server to omit ATM/1394 Bridge. In this case, the above-described processing of ATM/1394 Bridge is executed by video server. Alternatively, only ATM Switch may be omitted to directly connect the ATM/1394 Bridge and video server through ATM UNI.

In the case where transmittable isochronous packet maximum length is caused to be 1024 bytes in the above-mentioned embodiment, ratios of overheads in respective isochronous packets become equal to 3.0% (=(22+3)/(816+2+3)) even if 2 bytes as Data prefix and 24 bits (=3 bytes) as Data end are included. As compared to 41% in the conventional case, the ratio of overheads can be extremely reduced. Moreover, the number of client terminals to be accommodated in this case is also greatly improved so that 24 terminals are provided as compared to the conventional 19 terminals.

Further, since the transmit isochronous packet length is limited to 80% (816 bytes) of the maximum value of the transmittable isochronous packet length, this system can be used as traffic (e.g., audio on demand, telephone, various guide broadcast, etc.) of other isochronous packets in addition to video information.

Further, in the case where handling of packet by software using scheduling by timer interruption of 2 m sec is conventionally carried out, the number of events per scheduling period becomes equal to 304 (events), so it was required to carry out overhead processing of one isochronous packet within 6.6 µsec. However, in the embodiment of this invention, even in the case where the number of client terminals is set to 24 which is greater than 19, the number of events per scheduling period of 2 m sec is caused to be 16 (events). Accordingly, it is sufficient to carry out overhead processing of one isochronous packet within 125 µsec. Thus, handling of isochronous packet by software can be sufficiently carried out.

Figure 8:
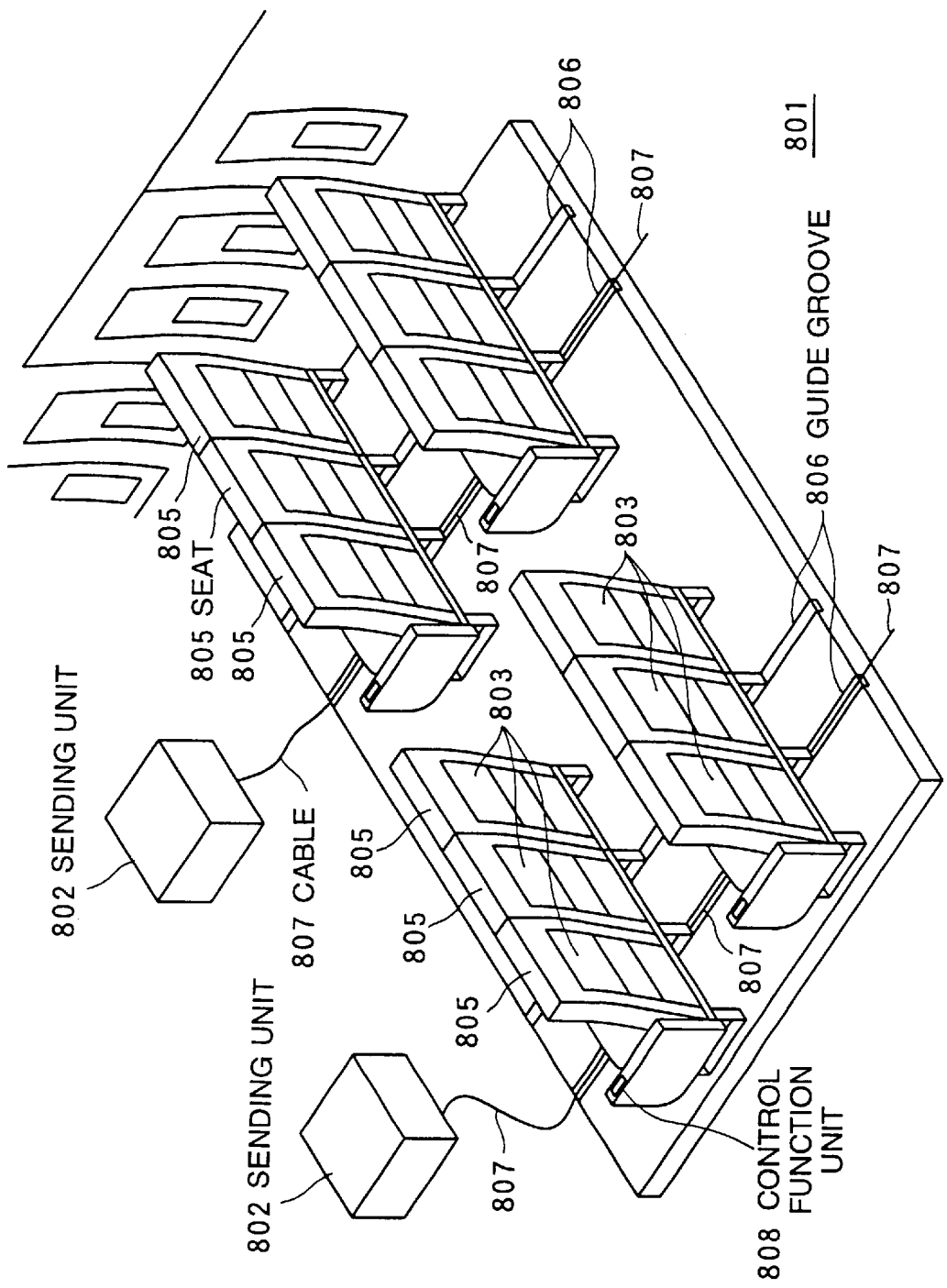
FIG. 8 is a view showing an example of the configuration of video on demand system to which data transmission system of this invention is applied.

FIG. 8 shows an example of the configuration of video on demand system to which this invention is applied. A sending unit 802 functions as a video server in which 1394 serial bus of small scale system is accommodated. At respective seats 805, there are respectively accommodated units corresponding to client terminal having a function to receive video stream addressed to the their own terminals transmitted from the sending unit 802 to decode it. These units serve to decode compression-encoded video stream distributed from the sending unit 802 to allow respective display units 803 of the front seats to display them. As this display unit 803, e.g., liquid crystal display may be used.

Further, at the chest portion of the seat 805, a fixed or detachable control function unit 808 is provided. This control function unit 808 can input various operations such as select, reproduction, temporary stop, fast feed and rewinding, etc. of video program as operation terminal of passenger.

In FIG. 8, cables 807 accommodated along guide grooves 806 correspond to ATM UNI 202-m in FIG. 2.

In the case where there is a necessity in which the video on demand system shown in FIG. 8 is caused to be of more large scale, it is sufficient that the interface of the sending unit 802 is changed into ATM UNI, and ATM Switch and ATM/1394 Bridge are added. Thus, it is possible to construct large scale video on demand system which can cover 300 to 500 seats. Also in this case, the seats 805 and the display units 803 may be the same as in the case of the small scale system.

While the 1394 serial bus is used as bus which connects the client terminals in the above-mentioned embodiment, isochronous ethernet may be used.

Industrial Applicability

In accordance with the data transmission system, the data transmission method, the data transmitting apparatus and the data transmitting method according to this invention, there is employed such a scheme to generate an interrupt signal in scheduling period units of which period is longer than a predetermined transmit period in carrying out transmission of data at a predetermined transmit period from server unit to terminal unit to carry out transmitting control of data every predetermined transmit period on the basis of quantity of transmittable data within one scheduling period. Accordingly, overhead in the data transmission is reduced.

What is claimed is:

1. A data transmission system adapted for carrying out transmission of data at a predetermined transmit period from server units to terminal equipments connected through a communication line,
wherein each of the server units comprises:
scheduling means for generating an interrupt signal at a scheduling period longer than the predetermined transmit period;
control means for carrying out transmitting control of data for the predetermined transmit period on the basis of quantity of transmittable data within one scheduling period unit; and
transmitting means for transmitting data on the basis of transmitting control from the control means, and
wherein each of the terminal equipments comprises receiving means for receiving data transmitted from the transmitting means of the server unit.

2. A data transmission system as set forth in claim 1, wherein the communication line is IEEE 1394 serial bus.

3. A data transmission system as set forth in claim 1, wherein the control means calculates, on the basis of the scheduling period and band width allocated to transmission, the quantity of transmittable data within the one scheduling period unit.

4. A data transmission system as set forth in claim 1, wherein the control means comprises count means indicating the quantity of transmittable data within the current scheduling period, whereby when the quantity of transmittable data that the count means indicates within the predetermined scheduling period is less than a predetermined value, transmission within the predetermined scheduling period is not carried out.

5. A data transmission system as set forth in claim 4, wherein the control means controls the quantity of transmittable data within the scheduling period that the count means indicates by taking into consideration fluctuation of delay in the communication line.

6. A data transmission system as set forth in claim 1, wherein the data caused to undergo transmission is packet partitioned the every predetermined data quantity, and
wherein in the case where the quantity of data caused to undergo transmission within the predetermined transmit period is the maximum quantity allowed within the predetermined transmit period or less, it conducts a control so as to transmit plural packet data within the same predetermined transmit period.

7. A data transmission system as set forth in claim 1, wherein the data caused to undergo transmission is packet data partitioned the every predetermined data quantity, and
wherein the control means is operative so that in the case where quantity of data caused to undergo transmission within the predetermined transmit period is greater than maximum quantity allowed within the predetermined transmit period and transmission time that the quantity of data caused to undergo transmission requires is the scheduling period or less, it conducts a control so as to transmit plural packet data at the plural predetermined transmit periods different from each other.

8. A data transmission method for carrying out transmission of data at a predetermined transmit period from server units to terminal equipments connected through a communication line,
the method including:
a data sending step executed at the server unit; and
a receiving step executed at the terminal equipment,
wherein the data sending step includes
a scheduling step of generating an interrupt signal at a scheduling period longer than the predetermined transmit period,
a control step of carrying out transmitting control of data every the predetermined transmit period on the basis of quantity of transmittable data within one scheduling period unit, and
a transmitting step of transmitting data on the basis of transmitting control from the control means,
wherein the receiving step includes a receiving step of receiving data transmitted at the transmitting step of the server unit.

9. A data transmission method as set forth in claim 8, wherein the communication line is IEEE 1394 serial bus.

10. A data transmission method as set forth in claim 8, wherein, at the control step, a procedure is taken to calculate, on the basis of the scheduling period and band width allocated to transmission, quantity of transmittable data within the one scheduling period unit.

11. A data transmission method as set forth in claim 8, wherein the control step includes a count step indicating quantity of transmittable data within current scheduling period, whereby when the quantity of transmittable data that the count step indicates within the predetermined scheduling period is less than a predetermined value, transmission within the predetermined scheduling period is not carried out.

12. A data transmission method as set forth in claim 11, wherein, at the control step, a procedure is taken to control quantity of transmittable data within scheduling period that the count step indicates by taking into consideration fluctuation of delay in the communication line.

13. A data transmission method as set forth in claim 8, wherein the data caused to undergo transmission is packet data partitioned every predetermined data quantity, and
wherein, at the control step, a procedure is taken such that in the case where quantity of data caused to undergo transmission within the predetermined transmit period is maximum quantity allowed within the predetermined transmit period or less, it conducts a control so as to transmit plural packet data within the same predetermined transmit period.

14. A data transmission method as set forth in claim 8, wherein the data caused to undergo transmission is packet data partitioned every predetermined data quantity, and
wherein, at the control step, a procedure is taken such that in the case where quantity of data caused to undergo transmission within the predetermined transmit period is greater than maximum quantity allowed within the predetermined transmit period and transmission time that quantity of data caused to undergo transmission requires is the scheduling period or less, it conducts a control so as to transmit plural packet data at the plural predetermined transmit periods different from each other.

15. A data transmitting apparatus adapted for transmitting data at a predetermined transmit period to terminal equipments connected through a communication line,
the apparatus comprising:
scheduling means for generating an interrupt signal at a scheduling period longer than the predetermined transmit period;

control means for carrying out transmitting control of data every the predetermined transmit period on the basis of quantity of transmittable data within one scheduling period unit, and transmitting means for transmitting data on the basis of transmitting control from the control means.

16. A data transmitting apparatus as set forth in claim 15, wherein the communication line is IEEE 1394 serial bus.

17. A data transmitting apparatus as set forth in claim 15, wherein the control means calculates, on the basis of the scheduling period and band width allocated to transmission, quantity of transmittable data within the one scheduling period unit.

18. A data transmitting apparatus as set forth in claim 15, wherein the control means comprises count means indicating quantity of transmittable data within current scheduling period, whereby when the quantity of transmittable data that the count means indicates within a predetermined scheduling period is less than a predetermined value, transmission within the predetermined scheduling period is not carried out.

19. A data transmitting apparatus as set forth in claim 18, wherein the control means controls the quantity of transmittable data within scheduling period that the count means indicates by taking into consideration fluctuation of delay in the communication line.

20. A data transmitting apparatus as set forth in claim 15, wherein the data to be transmitted is packet data partitioned the every predetermined data quantity, and wherein the control means is operative so that in the case where the quantity of data to be transmitted within the predetermined transmit period is the maximum quantity allowed within the predetermined transmit period or less, it conducts a control so as to transmit plural packet data within the same predetermined transmit period.

21. A data transmitting apparatus as set forth in claim 15, wherein the data to be transmitted is packet data partitioned the every predetermined data quantity, and wherein the control means is operative so that in the case where the quantity of data to be transmitted within the predetermined transmit period is greater than the maximum quantity allowed within the predetermined transmit period and transmission time that quantity of data to be transmitted requires is the scheduling period or less, it conducts a control so as to transmit plural packet data at the plural predetermined transmit periods different from each other.

22. A data transmitting method for transmitting data at a predetermined transmit period from server units to terminal equipments connected through a communication line, the method including:

a scheduling step of generating an interrupt signal at a scheduling period longer than the predetermined transmit period;

a control step of carrying out transmitting control of data every the predetermined transmit period on the basis of quantity of transmittable data within one scheduling period unit; and a transmitting step of transmitting data on the basis of transmitting control from the control means.

23. A data transmitting method as set forth in claim 22, wherein the communication line is IEEE 1394 serial bus.

24. A data transmitting method as set forth in claim 22, wherein, at the control step, a procedure is taken to calculate, on the basis of the scheduling period and band width allocated to transmission, quantity of transmittable data within the one scheduling period unit.

25. A data transmitting method as set forth in claim 22, wherein the control step includes a count step indicating quantity of transmittable data within current scheduling period, whereby when quantity of transmittable data that the count step indicates within a predetermined scheduling period is less than a predetermined value, transmitting processing within the predetermined scheduling period is not carried out.

26. A data transmitting method as set forth in claim 25, wherein, at the control step, a procedure is taken to control quantity of transmittable data within scheduling period that the count step indicates by taking into consideration fluctuation of delay in the communication line.

27. A data transmitting method as set forth in claim 22, wherein the data to be transmitted is packet data partitioned every predetermined data quantity, and wherein, at the control step, a procedure is taken such that in the case where quantity of data to be transmitted within the predetermined transmit period is maximum quantity allowed within the predetermined transmit period or less, it conducts a control so as to transmit plural packet data within the same predetermined transmit period.

28. A data transmitting method as set forth in claim 22, wherein the data to be transmitted is packet data partitioned every predetermined data quantity, and wherein, at the control step, a procedure is taken such that in the case where quantity of data to be transmitted within the predetermined transmit period is greater than maximum quantity allowed within the predetermined transmit period and transmission time that the quantity of data to be transmitted requires is the scheduling period or less, it conducts a control so as to transmit plural packet data at the plural predetermined transmit periods different from each other.

29. A data transmission system adapted for carrying out transmission of data at a predetermined transmit period from server units to terminal equipments connected through a communication line, wherein each of the server units comprises:

a scheduler for generating an interrupt signal at a scheduling period longer than the predetermined transmit period;

a controller for carrying out transmitting control of data for the predetermined transmit period on the basis of quantity of transmittable data within one scheduling period unit; and a transmitter for transmitting data on the basis of transmitting control from the controller, and wherein each of the terminal equipments comprises a receiver for receiving data transmitted from the transmitter of the server unit.

30. The data transmission system as set forth in claim 29, wherein the communication line is IEEE 1394 serial bus.

31. The data transmission system as set forth in claim 29, wherein the controller calculates, on the basis of the scheduling period and band width allocated to transmission, the quantity of transmittable data within the one scheduling period unit.

32. The data transmission system as set forth in claim 29, wherein the controller comprises a counter indicating the quantity of transmittable data within the current scheduling period, whereby when the quantity of transmittable data that the counter indicates within the predetermined scheduling period is less than a predetermined value, transmission within the predetermined scheduling period is not carried out.

33. The data transmission system as set forth in claim 32, wherein the controller controls the quantity of transmittable data within the scheduling period that the counter indicates by responding at least in part, to fluctuation of delay in the communication line.

34. The data transmission system as set forth in claim 29, wherein the data caused to undergo transmission is packet partitioned for every predetermined data quantity, and wherein plural packet data are transmitted within the same predetermined transmit period when the quantity of data caused to undergo transmission within the predetermined transmit period is maximum quantity allowed within the predetermined transmit period or less.

35. The data transmission system as set forth in claim 29, wherein the data caused to undergo transmission is packet data partitioned for every predetermined data quantity, and wherein the controller controls the transmission of plural packet data at different ones of the plural predetermined transmit periods when the quantity of data caused to undergo transmission within the predetermined transmit period is greater than maximum quantity allowed within the predetermined transmit period and the transmission time needed by the quantity of data caused to undergo transmission is the scheduling period or less.

36. A data transmitting apparatus adapted for transmitting data at a predetermined transmit period to terminal equipments connected through a communication line, the apparatus comprising:
 a scheduler for generating an interrupt signal at a scheduling period longer than the predetermined transmit period;
 a controller for carrying out transmitting control of data for every predetermined transmit period on the basis of quantity of transmittable data within one scheduling period unit, and
 a transmitter for transmitting data on the basis of transmitting control from the controller.

37. The data transmitting apparatus as set forth in claim 36, wherein the communication line is IEEE 1394 serial bus.

38. The data transmitting apparatus as set forth in claim 36, wherein the controller calculates, on the basis of the scheduling period and band width allocated to transmission, quantity of transmittable data within the one scheduling period unit.

39. The data transmitting apparatus as set forth in claim 36, wherein the controller comprises a counter indicating quantity of transmittable data within the current scheduling period, whereby when the quantity of transmittable data that the counter indicates within a predetermined scheduling period is less than a predetermined value, transmission within the predetermined scheduling period is not carried out.

40. The data transmitting apparatus as set forth in claim 39, wherein the controller controls the quantity of transmittable data within the scheduling period that the counter indicates by responding, at least in part, to fluctuation of delay in the communication line.

41. The data transmitting apparatus as set forth in claim 36, wherein the data to be transmitted is packet data partitioned for every predetermined data quantity, and wherein the controller is operative so that in the case where the quantity of data to be transmitted within the predetermined transmit period is the maximum quantity allowed within the predetermined transmit period or less, said controller conducts a control so as to transmit plural packet data within the same predetermined transmit period.

42. The data transmitting apparatus as set forth in claim 36, wherein the data to be transmitted is packet data partitioned for every predetermined data quantity, and wherein the controller is operative so that in the case where the quantity of data to be transmitted within the predetermined transmit period is greater than the maximum quantity allowed within the predetermined transmit period and the transmission time needed by the quantity of data to be transmitted is the scheduling period or less, said controller conducts a control so as to transmit plural packet data at different ones of the plural predetermined transmit periods.

43. A data transmission system as set forth in claim 1, wherein the predetermined transmit period is 80% or less of the scheduling period.

44. A data transmission method as set forth in claim 8, wherein the predetermined transmit period is 80% or less of the scheduling period.

45. A data transmitting apparatus as set forth in claim 15, wherein the predetermined transmit period is 80% or less of the scheduling period.

46. A data transmitting method as set forth in claim 22, wherein the predetermined transmit period is 80% or less of the scheduling period.

47. A data transmission system as set forth in claim 29, wherein the predetermined transmit period is 80% or less of the scheduling period.

48. The data transmitting apparatus as set forth in claim 36,
 wherein the predetermined transmit period is 80% or less of the scheduling period.

* * * * *